United States Patent
Muntnich et al.

[11] Patent Number: 5,885,009
[45] Date of Patent: Mar. 23, 1999

[54] CAGE FOR CYLINDRICAL ROLLING ELEMENTS

[75] Inventors: Leo Muntnich, Aurachtal; Herbert Zettner, Herzogenaurach, both of Germany

[73] Assignee: Ina Walzlager Schaeffler KG, Germany

[21] Appl. No.: 972,222

[22] Filed: Nov. 17, 1997

[30] Foreign Application Priority Data

Dec. 6, 1996 [DE] Germany ................ 196 50 733.2

[51] Int. Cl.⁶ .................................................. F16C 33/46
[52] U.S. Cl. .................................. 384/576; 384/572
[58] Field of Search ................................. 384/573, 576, 384/572, 574, 526

[56] References Cited

U.S. PATENT DOCUMENTS

| | | |
|---|---|---|
| 3,205,029 | 9/1965 | Greby . |
| 5,255,985 | 10/1993 | Alling . |
| 5,352,047 | 10/1994 | Ingall et al. . |

FOREIGN PATENT DOCUMENTS

| | | |
|---|---|---|
| 1914884 | 3/1965 | Germany . |
| 1957881 | 6/1970 | Germany . |
| 1964717 | 7/1971 | Germany . |
| 2441121 | 9/1982 | Germany . |
| 2648985 | 3/1985 | Germany . |
| 3608184 | 9/1987 | Germany . |
| 2115889 | 9/1983 | United Kingdom . |

*Primary Examiner*—Lenard A. Footland
*Attorney, Agent, or Firm*—Bierman, Muserlian and Lucas

[57] ABSTRACT

A cage (1) for cylindrical rolling elements (5) comprising two side rings (2, 3) connected to each other by circumferentially uniformly spaced crossbars (4) so that receiving pockets (6) are formed for the rolling elements (5) is characterized in that opposing end surfaces (8) of the pockets (6) comprise projections (11) which extend inwards in axial direction and bear against end faces of the rolling elements (5) which prevents an axial offset between the rolling elements (5) and the cage (1) so that after insertion and suspension of the first rolling element (5), the cage (1) can be filled with the rest of the rolling elements (5) without their being damaged.

6 Claims, 3 Drawing Sheets

CAGE FOR CYLINDRICAL ROLLING ELEMENTS

FIELD OF THE INVENTION

The invention concerns a cage for cylindrical rolling elements comprising two side rings connected to each other by circumferentially uniformly spaced crossbars so that receiving pockets are formed for the rolling elements.

BACKGROUND OF THE INVENTION

A cage of the above type is known from U.S. Pat. No. 5,255,985. For the installation of cages of this type in double rim bearings, as shown for example on Page 107 of INA Catalogue 306, the cylindrical rolling elements are pushed into the cage in radial direction from the inside to the outside. During this procedure, it often happens that the cage and the rolling elements are offset from one another i.e., there is no axial correspondence of position between the cage pocket and the rolling element, so that the rolling elements project beyond the axial length of the pockets into the region of the side rings of the cage. The side rings of the cage are damaged during the radial insertion of the rolling elements and spalling or tearing-out of the material of the cage occurs which can lead to a high reject rate of the bearings if the broken-off material penetrates into the raceway region. In the case of sleeve bearings i.e., bearings with very narrow rims, there exists the additional danger of the cage protruding beyond the rims in axial direction.

Another drawback of such cage and rolling element assemblies is the frequently occurring large rolling element sag i.e., the rolling elements fall downwards within the pockets due to the force of gravity so that a gap is formed between their rolling surface and the outer raceway. Due to this sag, the end face of a shaft introduced into the bearing comes to abut against the end faces of individual cylindrical rollers or against the end faces of the side rings of the cage itself which means that the insertion of the shaft is rather problematic so that an automatic assembly is rendered more difficult.

OBJECTS OF THE INVENTION

It is an object of the invention to configure a cage so that it is not damaged by the insertion of the rolling elements during assembly.

A further object of the invention is to configure a cage so that the insertion of a shaft into the bearing is possible without obstruction.

These and other objects and advantages of the invention will become obvious from the following detailed description.

SUMMARY OF THE INVENTION

The invention achieves these objects by the fact that opposing end surfaces of the pockets comprise projections which point inwards in axial direction and bear against the end faces of the rolling elements. In this way, the cage is centered and retained relative to the rolling element so that the axial play of the rolling element in the pocket is ineffective and the lateral protrusion is reduced by this amount. After the insertion i.e., suspension of the first rolling element, the cage is retained centered between the rims of the outer ring so that the rest of the rolling elements can be suspended in place without any problem by an axial positional correspondence with the cage. In other words, due to the positional correspondence thus established between the rolling elements and the cage, the rolling elements do not damage the side rings of the cage.

According to another feature of the invention, a recess is arranged next to the projections which enables the play of the rolling elements in the pockets required during operation of the bearing to be obtained by a displacement of the projections into the recess.

The invention further provides that the projections have a filigree structure or are elastically deformable so that, after a few rotations of the bearing, a normal operational clearance is obtained between the rolling elements and the cage due to elastic deformation or wear of the projections. This means that the rolling elements can be inserted into the cage without any problem during assembly since the cage is appropriately aligned with the rolling elements. The play required in the pockets during operation of the bearing is formed all the same because the projections become ineffective after a few rotations of the bearing due to elastic deformation or wear.

According to an alternative embodiment of the invention, the cage comprises axially outwards extending projections which are situated within or without a pitch circle and are in contact with radially extending rims of an inner or an outer ring. According to a further feature of this solution, the projections have an elastic configuration. Due to these elastic lateral guide elements, the cage can be guided, freed from play to a large extent, between the rims of the outer or the inner ring, it being possible to design the suspension to be in a range from slight play up to slight overlap. This is particularly advantageous in the case of thin-walled sleeve bearings because their rims have only sheet thickness and the side rings of the cage can project beyond them.

According to a further feature of the invention, radially outwards pointing elastic projections are arranged on the outer peripheral surface of the side rings of the cage and are in contact with the rims of the outer ring. The cage is retained in a centered position by the elastic projections so that a one-sided support of the cage on one of the rims is excluded and the end face of the shaft to be inserted does not strike against the end faces of the rolling elements. According to another feature of the invention, a recess is arranged next to the elastic projections which can thus be displaced into the recess in the manner described above.

According to still another feature of the invention, the elastic projections have a filigree structure or are elastically deformable so that, after a few rotations of the bearing, a normal operational clearance is obtained between the cage and the outer ring due to elastic deformation or wear of the elastic projections. This means that after a few rotations, these elastic projections are ineffective due to elastic deformation or wear so that the normal play between the cage and the rims of the bearing ring is formed.

DETAILED DESCRIPTION OF THE DRAWINGS

Figure 5:
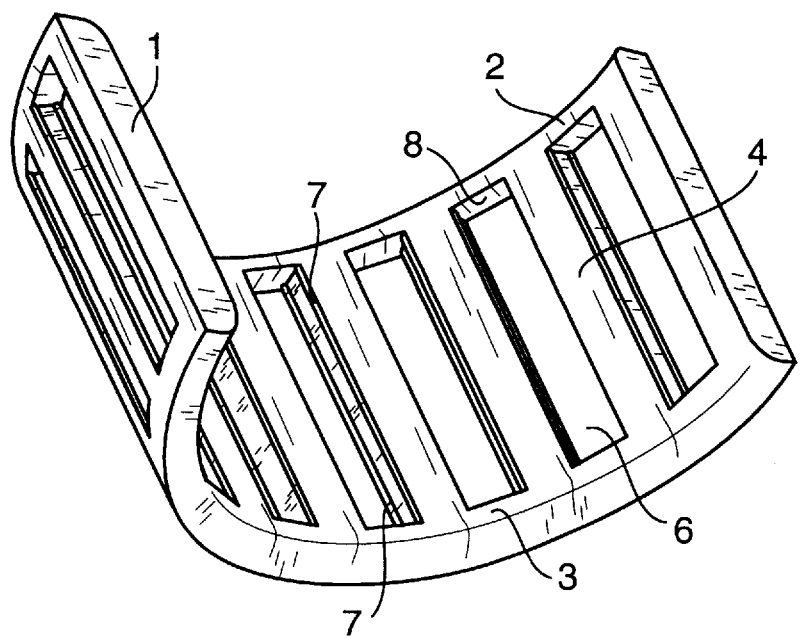
FIG. 5 is a perspective representation of one half of a prior art cage.

FIG. 5 shows a rolling bearing cage 1 comprising two side rings 2 and 3 which are connected to each other by circumferentially uniformly spaced crossbars 4 so that receiving pockets 6 are formed for rolling elements 6. The pockets 6 comprise retention means 7 for the rolling elements 5. It can be seen that the side rings 2 and 3 of the cage 1 can be damaged during the insertion of the rolling elements 5 if the rolling elements 5 project beyond the end surface 8 of the pockets 6 in axial direction. In such a case, material is torn out of the side ring 2 or 3 during insertion of the rolling element 5 into the pocket 6 and can lead to a premature failure of the bearing.

Figure 1:
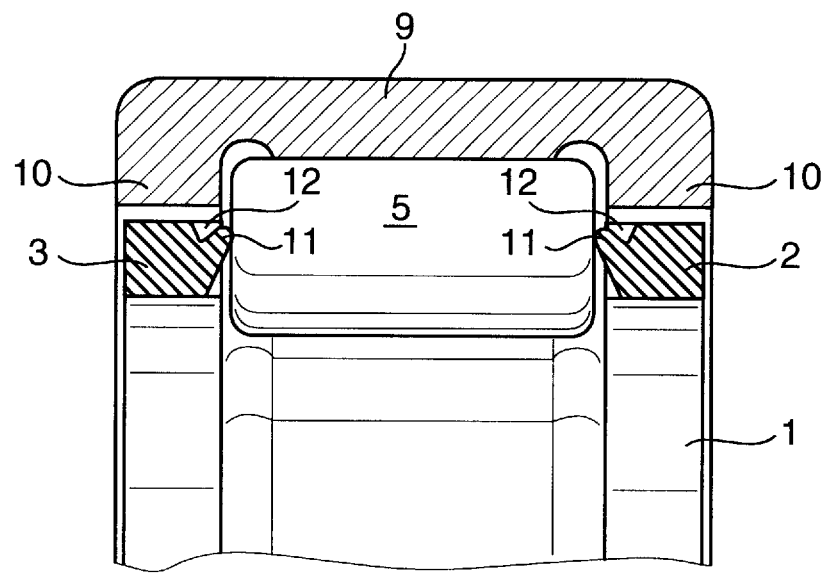
FIGS. 1, 3 and 4 are partial longitudinal cross-sections through a radial bearing.
Figure 2:
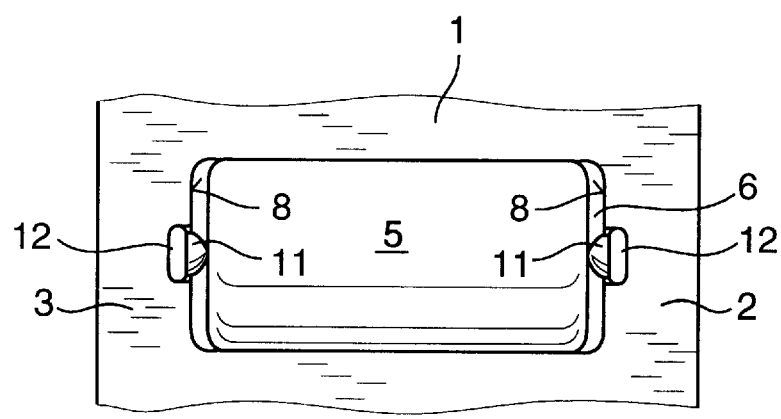
FIG. 2 is a top view of a cage of FIG. 1.

This axial offset between the rolling element 5 and the cage 1 which obstructs the mounting of the rolling element 5 is prevented in the bearing shown in FIGS. 1 and 2 by projections 11 which are arranged on the end surfaces 8 of the pockets 6. When the first rolling element 5 has been elastically suspended between the rims 10 of the outer ring 9, the cage 1 bears against the end faces of the rolling elements 5 by its axially inwards extending projections 11 and is thus retained in a centered position i.e., the axial play of the rolling element 5 in the pocket 6 is ineffective. The rest of the rolling elements 5 can then be inserted without any problem into the cage 1 which is axially aligned to the first rolling element 5.

In the present example, the projections 11 have an elastic configuration and can be displaced into the recess 12 upon displacement of the rolling elements 5 in axial direction, so that the required axial play of the rolling elements 5 in the pockets 6 is guaranteed. However, it is also possible to make the projections with such a fine structure that they are worn off already after a few rotations of the bearing.

Figure 3:
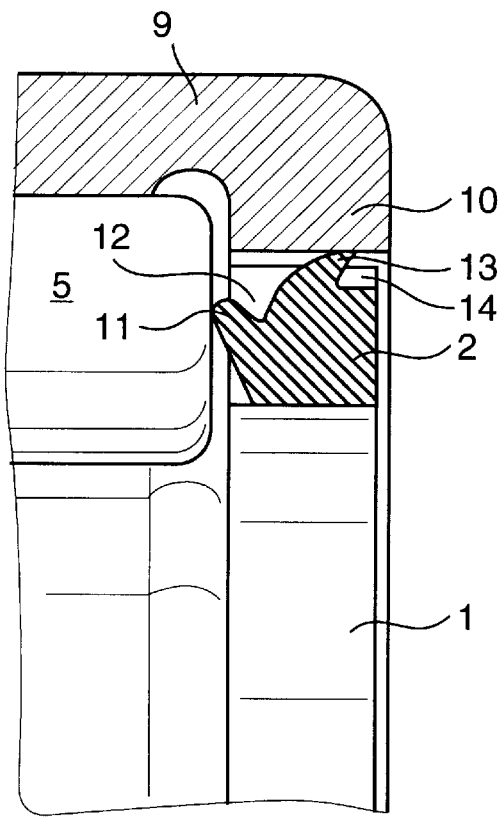

In the bearing represented in FIG. 3, radially outwards extending projections 13 are additionally arranged on the outer peripheral surface of the outer rings 2 and 3 of the cage 1 and bear against the rims 10 of the outer ring 9. Due to this suspension on the rims 10, the cage 1 cannot change its position in the radial direction so that the rolling elements 5 too, cannot move downwards, or can sag only very slightly within the pockets 6. This in turn means that the end face of a shaft to be introduced into the bearing does not strike the end faces of the rolling elements 5. As can be seen further in FIG. 3, the projections 13 can likewise be displaced into a recess 14 so that the required play of the cage 1 between the rims 10 of the outer bearing ring 9 is assured.

Figure 4:
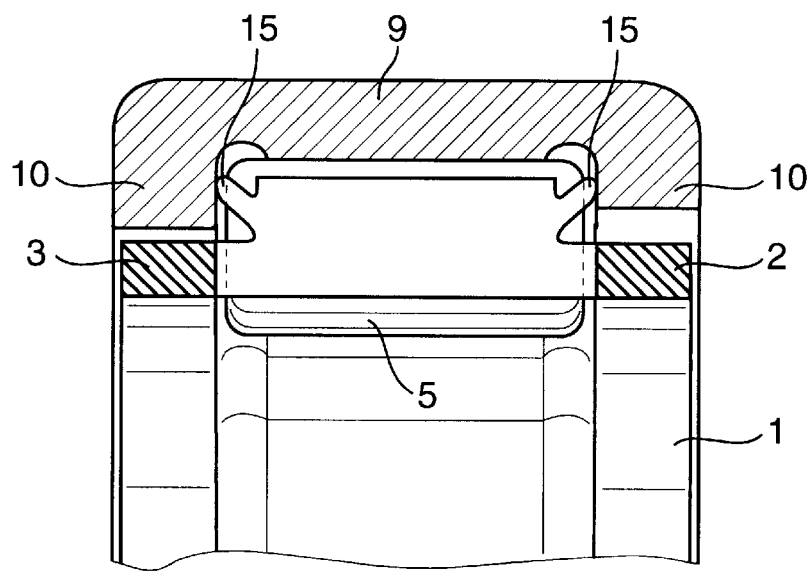

Finally, in the sleeve bearing shown in FIG. 4, axially outwards extending projections 15 are arranged outside the pitch circle on the cage 1 and bear against the inner surfaces of the rims 10 of the outer ring 9. In this way, the side rings 2 and 3 of the cage 1 are prevented from projecting axially beyond the rims 10 which are thin-walled particularly in the case of sleeve bearings.

Various modifications of the cage of the invention may be made without departing from the spirit or scope thereof and it should be understood that the invention is intended to be limited as defined in the appended claims.

What we claim is:

1. A roller bearing comprising: an outer ring (9) having radially inwardly extending rims (10); a cage (1) having two side rings (2, 3) connected to each other by circumferentially uniformly spaced crossbars (4) so that receiving pockets (6) are formed, said side rings (2, 3) being circumferentially surrounded by said rims (10) and cylindrical rolling elements (5) being inserted into said pockets (6);

said rolling elements (5) having plane shaped end faces characterized in that opposing end surfaces (8) of the pockets (6) comprise projections (11) which extend inwards in axial direction and bear against said end faces.

2. A bearing of claim 1 wherein a recess (12) is arranged next to the projections (11).

3. A bearing of claim 1 wherein the projections (11) have a filigree structure or are elastically deformable so that, after a few rotations of a bearing in which the cage (1) is arranged, a normal operational clearance is obtained between the rolling elements (5) and the cage (1) due to elastic deformation or wear of the projections (11).

4. A bearing of claim 1 wherein radially outwards extending elastic projections (13) are arranged on an outer peripheral surface of the side rings (2, 3) of the cage (1) and are in contact with rims (10) of the outer bearing ring (9).

5. A bearing of claim 4 wherein a recess (14) is arranged next to the elastic projections (13).

6. A bearing of claim 4 wherein the elastic projections (13) have a filigree structure or are elastically deformable so that, after a few rotations of a bearing in which the cage (1) is arranged, a normal operational clearance is obtained between the cage (1) and the outer bearing ring (9) due to elastic deformation or wear of the elastic projections (13).

* * * * *